US005429769A

United States Patent [19]

Nicholson et al.

[11] Patent Number: 5,429,769

[45] Date of Patent: Jul. 4, 1995

[54] PEROXYCARBOXYLIC ACIDS AND MANGANESE COMPLEX CATALYSTS

[75] Inventors: John R. Nicholson, Ramsey; Richard G. Gary, West New York, both of N.J.

[73] Assignee: Lever Brothers Company, Division of Conopco, Inc., New York, N.Y.

[21] Appl. No.: 96,877

[22] Filed: Jul. 26, 1993

[51] Int. Cl.[6] .............................................. C01B 15/10

[52] U.S. Cl. .......................... 252/186.42; 252/186.26; 252/186.33; 252/95; 252/99; 562/2

[58] Field of Search ...................... 252/186.26, 186.33, 252/186.42, 95

[56] References Cited

U.S. PATENT DOCUMENTS

| | | | |
|---|---|---|---|
| 4,626,373 | 12/1986 | Finch et al. | 252/96 |
| 4,642,198 | 2/1987 | Humphreys et al. | 252/94 |
| 4,728,455 | 3/1988 | Rerek | 252/99 |
| 4,992,194 | 2/1991 | Liberati et al. | 252/99 |
| 5,021,187 | 6/1991 | Harriott et al. | 252/186.38 |
| 5,041,232 | 8/1991 | Batal et al. | 252/94 |
| 5,114,606 | 5/1992 | van Vliet et al. | 252/103 |
| 5,114,611 | 5/1992 | van Kralingen | 252/186.33 |
| 5,153,161 | 10/1992 | Kerschner et al. | 502/167 |
| 5,194,416 | 3/1993 | Jureller et al. | 502/167 |
| 5,227,084 | 7/1993 | Martens et al. | 252/95 |
| 5,244,594 | 9/1993 | Favre et al. | 252/186.33 |
| 5,246,612 | 9/1993 | Van Dijk et al. | 252/102 |
| 5,246,621 | 9/1993 | Favre et al. | 252/186.33 |
| 5,292,447 | 3/1994 | Ventuiello et al. | 252/102 |

FOREIGN PATENT DOCUMENTS

| | | |
|---|---|---|
| 42939/89 | 5/1990 | Australia . |
| 347724 | 12/1989 | European Pat. Off. . |
| 349940 | 1/1990 | European Pat. Off. . |
| 435379 | 7/1991 | European Pat. Off. . |
| 90/14336 | 11/1990 | WIPO . |

OTHER PUBLICATIONS

J. Am. Chem. Soc. (Wieghardt et al.), 1988, vol. 110, pp. 7398-7411.

J. Chem. Soc. (Wieghardt et al.), 1988, pp. 1145-1146.

Copending applications: Kerschner et al., S/N 07/900,861; Kerschner et al. 07/909,358; Kerschner et al., 07/942,574; Delwel, S/N 07/978,554; Gary et al., S/N 08/096,879; Nicholson et al., S/N 08,097,150.

*Primary Examiner*—Richard D. Lovering
*Assistant Examiner*—Joseph D. Anthony
*Attorney, Agent, or Firm*—A. Kate Huffman

[57] ABSTRACT

A bleaching composition and method of using is provided wherein the composition comprises an effective amount for bleaching of an organic peroxyacid whose structure includes a percarboxylic and a carboxylic acid or a salt functional unit; an effective amount of manganese complex having a formula selected from the group consisting of:

$$[LMnX_3]Y \quad (1)$$

wherein Mn is manganese;

X is a coordinating species selected from the group consisting of:

$RO^-$, $Cl^-$, $Br^-$, $I^-$, $F^-$, $NCS^-$, $N_3^-$, $I_3^-$, $NH_3$, $NR_3$, $RCOO^-$, $RSO_3^-$, $RSO_4^-$, $OH^-$, $O_2^{2-}$, $HOO^-$, $H_2O$, $SH^-$, $CN^-$, $OCN^-$, and $S_4^{2-}$ and combinations thereof;

R is a $C_1$-$C_{20}$ radical selected from the group consisting of alkyl, cycloalkyl, aryl, benzyl and radical combinations thereof;

at least two R radicals may also be connected to one another so as to form a bridging unit between two oxygens that coordinate with the manganese;

L is a ligand selected from a $C_3$-$C_{60}$ radical having at least 3 nitrogen atoms coordinating with the manganese; and the formula:

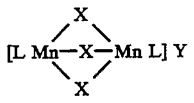

(2)

wherein Mn is manganese in a +III or +IV oxidation state and X, L and Y are as defined above; and from about 0.5 to about 50 wt. % of a surfactant. The pH range of the compositions of the invention is from about 7 to about 10.

7 Claims, No Drawings

PEROXYCARBOXYLIC ACIDS AND MANGANESE COMPLEX CATALYSTS

FIELD OF THE INVENTION

The invention concerns bleaching compositions comprising novel peroxycarboxylic acids combined with manganese complex catalysts which are used as bleaches for stain removal.

BACKGROUND OF THE INVENTION

Organic peroxyacids have long been known for their excellent bleaching activity. For instance, U.S. Pat. No. 4,642,198 (Humphreys et al) describes a variety of water-insoluble organic peroxyacids intended for suspension in an aqueous, low pH liquid. The preferred peroxy material is 1,12-diperoxydodecanedioic acid (DPDA). Surfactants, both anionic and nonionic, are utilized as suspending agents. When formulated with 10% surfactant, DPDA exhibits good stability under storage conditions. When the surfactant level of the formulation is increased to 22%, a level typical for a heavy-duty laundry detergent, the half-life of the DPDA decreases dramatically. For example, U.S. Pat. No. 4,992,194 (Liberti et al) reports that at 40° C. the half-life of DPDA is only 1 to 2 weeks in a pH 4–4.5 heavy-duty laundry liquid.

EP 0 349 940 (Hoechst A. G.) describes a series of imido peroxyacids, chief among which is N-phthaloylamino peroxycaproic acid (PAP). Suspension of imidoperoxycarboxylic acids in an aqueous system is achieved through use of sodium alkylbenzene sulfonate as reported in EP 0 435 379 (Akzo N. V.). Related technology in EP 0 347 724 (Ausimont) discloses heterocyclic peracids such as N-acyl-piperidine percarboxylic acids. WO 90/14336 (Interox) discloses 6,6'-terephthal-di(amidoperoxy-hexanoic) acid and 6,6'-fumaryl bis (amidoperoxyhexanoic) acid.

Although many of the amido peroxyacids have a quite dramatic bleaching activity, their stability in surfactant solutions remains a considerable problem. These materials also need to be physically stable in terms of thermal and shock sensitivity and in terms of storage stability.

Oxygen-releasing materials have an important limitation in that their activity is extremely temperature dependent. Temperatures in excess of 60° C. are normally required to achieve any bleach effectiveness in an aqueous wash system. The art has partially solved this problem through the use of activators. These activators, also known as bleach precursors or oxidation catalysts react with oxygen releasing materials to generate more effective oxidating species.

A variety of mononuclear manganese complexes used as such oxidation catalysts have been described in EP 458,397 (Favre et al.) and EP 458,398 (Favre et al.). Several dinuclear manganese complexes were first synthesized and described by K. Wieghardt in the "Journal of American Chemical Society, 1988, Vol. 110, No. 22, p. 7398 and in the "Journal of the Chemical Society—Chemical Communications", 1985, p. 1145. The combination of such manganese catalysts with peroxygen compounds is described in Martens et al., U.S. Ser. No. 07/869,587.

It has been surprisingly found that the bleaching activity of organic peroxyacids having a percarboxylic and a carboxylic acid, or a salt functional unit, when combined with manganese catalysts is significantly improved under alkaline conditions.

It is thus an object of the present invention to provide novel peroxycarboxylic acids in combination with manganese catalysts to provide an improved bleaching system and detergent composition containing such system.

It is another object of the present invention to improve the performance of the new peroxycarboxylic acid and manganese catalyst bleaching system in highly alkaline detergent formulations.

A further object of the present invention is to provide a bleaching system which operates over a wide temperature range including those temperatures under 60° C.

Another object of the present invention is to provide bleach improvement through the combination of novel peroxycarboxylic acids and manganese catalysts which are effective in relatively small amounts to provide stable compositions and to avoid substantial incremental cost.

A still further object of the present invention is to provide a method for bleaching stained surfaces such as clothes, household hard surfaces including sinks, toilets and the like, dishware and even dentures.

These and other objects will become apparent in the following description of the invention.

SUMMARY OF THE INVENTION

A bleaching composition is provided comprising:

(a) an effective amount for bleaching of an organic peroxy acid whose structure includes a percarboxylic and a carboxylic acid or salt functional unit;

(b) a manganese complex having a formula selected from the group consisting of:

$$[LMnX_3]Y \qquad (1)$$

wherein Mn is manganese;

X is a coordinating species selected from the group consisting of:

$RO^-$, $Cl^-$, $Br^-$, $I^-$, $F^-$, $NCS^-$, $N_3^-$, $I_3^-$, $NH_3$, $NR_3$, $RCOO^-$, $RSO_3^-$, $RSO_4^-$, $OH^-$, $O_2^{2-}$, $HOO^-$, $H_2O$, $SH^-$, $CN^-$, $OCN^-$, and $S_4^{2-}$ and combinations thereof;

R is a $C_1$–$C_{20}$ radical selected from the group consisting of alkyl, cycloalkyl, aryl, benzyl and radical combinations thereof;

at least two R radicals may also be connected to one another so as to form a bridging unit between two oxygens that coordinate with the manganese;

L is a ligand selected from a $C_3$–$C_{60}$ radical having at least 3 nitrogen atoms coordinating with the manganese; and Y is an oxidatively-stable counterion; and the formula:

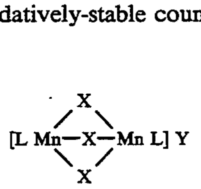

(2)

wherein Mn is manganese in a +III or +IV oxidation state and X, L and Y are as defined above; and (c) from about 0.5 to about 50% by weight of a surfactant, wherein the bleaching composition has a pH in the range of 8 to 10.

The peroxy acid compounds of the invention have the formula:

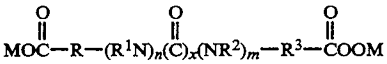

(I)

wherein

R is selected from the group consisting of $C_1$–$C_{16}$alkylene, $C_1$–$C_{16}$cycloalkylene and $C_6$–$C_{12}$arylene radicals;

$R^1$ is selected from the group consisting of hydrogen, $C_1$–$C_{16}$cycloalkyl and $C_6$–$C_2$aryl radicals;

$R^2$ is selected from the group consisting of hydrogen, $C_1$–$C_{16}$alkyl, $C_1$–$C_{16}$cycloalkyl and $C_1$–$C_{12}$aryl radicals and a carbonyl radical that can form a ring together with R when R is arylene;

$R^3$ is selected from the group consisting of $C_1$–$C_{16}$alkylene, $C_5$–$C_{12}$ cycloalkylene and $C_6$–$C_{12}$arylene radicals;

n is 0 or 1;

m is 0 or 1 and the sum of n and m is not greater than 1;

x is 0 or 1; and

M is selected from the group consisting of hydrogen, alkali metal, alkaline earth metal, ammonium and alkanolammonium cations and radicals. Preferred compounds within the compounds of formula I include those peroxy acids in which n, m and x each represent 0.

Especially preferred compounds are amido peroxy acid compounds having the formula:

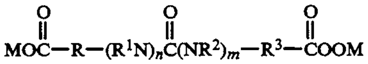

(II)

wherein:

R is selected from the group consisting of $C_1$–$C_{16}$alkylene, $C_1$–$C_{16}$cycloalkylene and $C_6$–$C_{12}$arylene radicals;

$R^1$ is selected from the group consisting of hydrogen, $C_1$–$C_{16}$cycloalkyl and $C_6$–$C_{12}$aryl radicals;

$R^2$ is selected from the group consisting of hydrogen, $C_1$–$C_{16}$alkyl, $C_1$–$C_{16}$cycloalkyl and $C_6$–$C_{12}$aryl radicals and a carbonyl radical that can form a ring together with R when R is arylene;

$R^3$ is selected from the group consisting of $C_1$–$C_{16}$alkylene, $C_5$–$C_{12}$cycloalkylene and $C_6$–$C_{16}$arylene radicals;

n and m are integers whose sum is 1; and

M is selected from the group consisting of hydrogen, alkali metal, alkaline earth metal, ammonium and alkanolammonium cations and radicals.

A method of bleaching a substrate is also provided which comprises contacting the substrate with a bleaching composition comprising an effective amount of an organic peroxy acid whose structure includes a percarboxylic and a carboxylic acid or salt-functional unit, an effective amount of manganese complex having a formula (1), (2) or mixtures thereof and about 0.5 to about 50% by weight of a surfactant.

DETAILED DESCRIPTION OF THE PREFERRED EMBODIMENTS

The present invention relates to a bleaching composition comprising novel percarboxylic acids having the formula:

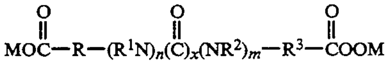

(I)

wherein:

R is selected from the group consisting of $C_1$–$C_{16}$alkylene, $C_1$–$C_{16}$cycloalkylene and $C_6$–$C_{12}$arylene radicals;

$R^3$ is selected from the group consisting of $C_1$–$C_{16}$cycloalkyl and $C_5$–$C_{12}$aryl radicals;

$R^3$ is selected from the group consisting of hydrogen, $C_1$–$C_{16}$alkyl, $C_5$–$C_{12}$cycloalkyl and $C_6$–$C_{12}$aryl radicals and a carbonyl radical that can form a ring together with R when R is arylene;

$R^3$ is selected from the group consisting of $C_1$–$C_{16}$alkylene, $C_5$–$C_{12}$cycloalkylene and $C_6$–$C_{12}$arylene radicals;

n and m are integers which each represent 0 or 1 and whose sum is not greater than 1;

x is 0 or 1; and

M is selected from the group consisting of hydrogen, alkali metal, alkaline earth metal, ammonium and alkanolammonium cations and radicals.

Preferred compounds within Formula I include those compounds wherein n, x and m each represent 0. An example is magnesium monoperoxyphthalic acid.

Especially preferred compounds within Formula I include amido peroxy acid compounds having the structure:

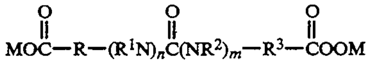

(II)

wherein:

R, $R^1$, $R^2$, $R^3$, n, m, and M are as defined above.

Especially preferred compounds within Formula II include compounds having the structure:

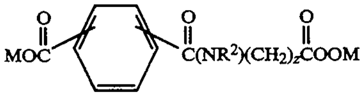

(III)

wherein:

z is an integer ranging from 1 to 12.

Especially preferred within the subcategory are substances with the structure:

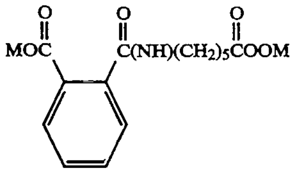

(IV)

An example of a compound of formula IV is O-carboxybenzamidoperoxy hexanoic acid.

Manganese Complex Catalysts

The catalysts of the invention are manganese complexes of formulas (1) and (2). The structure of formula (1) is as follows:

$$[LMnX_3]Y \quad (1)$$

wherein

Mn is manganese;

X is a coordinating species selected from the group consisting of:

$RO^-$, $Cl^-$, $Br^-$, $I^-$, $F^-$, $NCS^-$, $N_3^-$, $I_3^-$, $NH_3$, $NR_3$, $RCOO^-$, $RSO_3^-$, $RSO_4^-$, $OH^-$, $O_2^{2-}$, $HOO^-$, $H_2O$, $SH^-$, $CN^-$, $OCN^-$, and $S_4^{2-}$ and combinations thereof;

R is a $C_1$-$C_{20}$ radical selected from the group consisting of alkyl, cycloalkyl, aryl, benzyl and radical combinations thereof;

at least two R radicals may also be connected to one another so as to form a bridging unit between two oxygens that coordinate with the manganese;

L is a ligand selected from a $C_3$-$C_{60}$ radical having at least 3 nitrogen atoms coordinating with the manganese; and Y is an oxidatively-stable counterion.

Counterion Y is usually an anion selected from the group consisting of: $Cl^-$, $Br^-$, $I^-$, $NO_3^-$, $ClO_4^-$, $NCS^-$, $PF_6^-$, $SO_4^{2-}$, $OAc^-$, $BPh_4^-$, $CF_3SO_3^-$, $RSO_3^-$, and $RSO_4^-$.

Preferred Formula (2) has the structure:

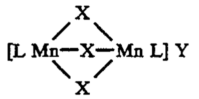

(2)

wherein Mn is manganese in a +III or +IV oxidation state and X, L and Y are as defined above.

The counterion Y needed for charge neutrality of the complex is generally provided by carrying out the complexation reaction in the presence of a counterion-forming salt. Though the type of the counterion-forming salt, e.g. chlorides; sulphates; nitrates; methylsulphates; and surfactants such as alkyl sulphates, alkyl sulphonates, alkylbenzene sulphonates, tosylates, trifluoromethyl sulphonates, perchlorates, $NaBH_4$ and $KPF_6$, is not critical for the conversion, some salts are more preferred than others in terms of product properties or safety. For example, small counterions will produce oily liquids and perchlorates are potentially explosive and could become a severe hazard upon large-scale preparation. Preferred counterions are the large molecules from surfactants, especially tosylate. A particularly preferred counterion is $PF_6^-$, which is conveniently obtained from $KPF_6$. Dinuclear manganese (III) and manganese (IV) complexes having $PF_6^-$ as the counterion, are solid crystalline products which are easy to handle and to form into a granulated catalyst product.

Ligands which are suitable for the present invention are for illustrative purposes only, listed through the structural acyclic and cyclic formulas which follow:

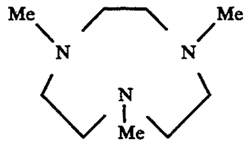

(I)

-continued

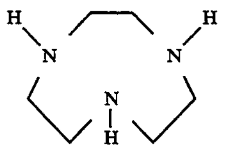

(II)

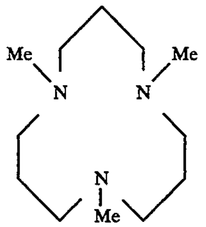

(III)

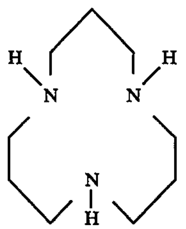

(IV)

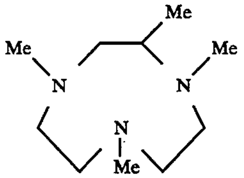

(V)

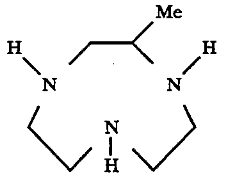

(VI)

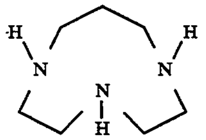

(VII)

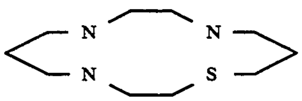

(VIII)

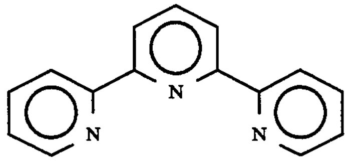

(IX)

Ligand I is 1,4,7-trimethyl-1,4,7-triazacyclononane, coded as Me-TACN; ligand II is 1,4,7-triazacyclononane, coded as TACN; ligand III is 1,5,9-trimethyl-1,5,9-triazacyclododecane, coded as Me-TACD; ligand V is 2-methyl-1,4,7-trimethyl-1,4,7-triazacyclononane, coded as Me/Me-TACN; and ligand VI is -methyl-1,4,7-triazacyclononane, coded as Me/TACN.

Illustrative of the most preferred mononuclear manganese complexes are the $SO_4^{2-}$ and $PF_6^-$ salts of Mn(IV)MeTACN(OMe)$_3$.

Most preferred of the dinuclear manganese complexes are those with the following structure:

[LMn(IV)(μ-O)$_3$Mn(IV)L]Y wherein L and Y are as described above.

Specifically preferred is a compound of the structure:

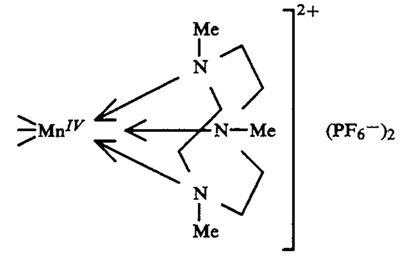

abbreviated as $[Mn^{IV}_2(\mu\text{-}O_3(\text{Me-TACN})_2](PF_6)_2$.

According to the present invention, the manganese complex may be utilized directly or as adsorbed onto a solvent insoluble support surface. Illustrative but non-limiting examples of such substrates are structured aluminasilicates (e.g. Zeolite A, faujasite and sodalite), amorphous aluminasilicates, silica, alumina, charcoal, microporous polymeric resins (e.g. polystyrene beads formed through high internal phase emulsion technology) and clays (especially layered clays such as hectorite and hydrotalcite). Relative weight ratios of the manganese complex to the support may range anywhere from about 10:1 to about 1:10,000.

Detergent Composition

When incorporated into a cleaning composition, the peroxy acids, especially preferred the amido peroxy acids, of the present invention will range in concentration from about 1 to about 40%, preferably from about 1.5 to about 15%, optimally between about 2 and about 5% by weight.

The manganese complex catalyst is present in a concentration of from about 0.001% to 0.05 wt. % preferably 0.002% to 0.02%, most preferably 0.005% to 0.02%.

A detergent formulation containing a peroxyacid bleach system according to the invention will usually also contain surface-active materials and detergency builders. When in liquid form, the surface-actives serve not only to clean but importantly function as structuring systems to suspend the water-insoluble amido or imido peroxyacids in water or any other solvent carrier. For heavy-duty laundry liquids, it is also important to include a pH adjusting system and advantageously a deflocculating polymer.

The surface-active material may be naturally derived, such as soap or a synthetic material selected from anionic, nonionic, amphoteric, zwitterionic, cationic actives and mixtures thereof. Many suitable actives are commercially available and are fully described in the literature, for example in "Surface Active Agents and Detergents", Volumes I and II, by Schwartz, Perry and Berch. The total level of the surface-active material may range up to 50% by weight, preferably being from about 1% to about 40% by weight of the composition, most preferably 4 to 25%.

Synthetic anionic surface-actives are usually water-soluble alkali metal salts of organic sulfates and sulfonates having alkyl radicals containing from about 8 to about 22 carbon atoms, the term alkyl being used to include the alkyl portion of higher aryl radicals.

Examples of suitable synthetic anionic detergent compounds are sodium and ammonium alkyl sulfates, especially those obtained by sulfating higher ($C_8$–$C_{18}$) alcohols produced for example from tallow or coconut oil; sodium and ammonium alkyl ($C_9$–$C_{20}$) benzene sulfonates, particularly sodium linear secondary alkyl ($C_{10}$–$C_{15}$) benzene sulfonates; sodium alkyl glyceryl ether sulfates, especially those ethers of the higher alcohols derived from tallow coconut oil and synthetic alcohols derived from petroleum; sodium coconut oil fatty acid monoglyceride sulfates and sulfonates; sodium and ammonium salts of sulfuric acid esters of higher ($C_9$–$C_{18}$) fatty alcohol-alkylene oxide, particularly ethylene oxide reaction products; the reaction products of fatty acids such as coconut fatty acids esterified with isethionic acid and neutralized with sodium hydroxide; sodium and ammonium salts of fatty acid amides of methyl taurine; alkane monosulfonates such as those derived by reacting alpha-olefins ($C_8$–$C_{20}$) with sodium bisulfite and those derived by reacting paraffins with $SO_2$ and $Cl_2$ and then hydrolyzing with a base to produce a random sulfonate; sodium and ammonium $C_7$–$C_{12}$dialkyl sulfosuccinates; and olefinic sulfonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulfonates; sodium ($C_{16}$–$C_{18}$) alkyl sulfates and sodium ($C_{16}$–$C_{18}$)alkyl ether sulfates.

Examples of suitable nonionic surface-active compounds which may be used preferably together with the anionic surface active compounds, include in particular, the reaction products of alkylene oxides, usually ethylene oxide, with alkyl ($C_6$–$C_{22}$) phenols, generally 2–25 EO, i.e. 2–25 units of ethylene oxide per molecule; the condensation products of aliphatic ($C_8$–$C_{18}$) primary or secondary linear or branched alcohols with ethylene oxide, generally 2–30 EO, and products made by condensation of ethylene oxide with the reaction products of propylene oxide and ethylene diamine. Other so-called nonionic surface-actives include alkyl polyglycosides, fatty alkylamides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compound is used, it is generally in small amounts in compositions based on the much more commonly used synthetic anionic and nonionic actives.

The detergent compositions of the invention will normally also contain a detergency builder. Builder materials may be selected from (1) calcium sequestrant materials, (2) precipitating materials, (3) calcium ion-exchange materials and (4) mixtures thereof.

In particular, the compositions of the invention may contain any one of the organic or inorganic builder materials, such as sodium or potassium tripolyphosphate, sodium or potassium pyrophosphate, sodium or potassium orthophosphate, sodium carbonate, the sodium salt of nitrilotriacetic acid, sodium citrate, carboxymethylmalonate, carboxymethyloxysuccinate, tartr ate mono- and di-succinates, oxydisuccinate, crystalline or amorphous aluminosilicates and mixtures thereof.

Polycarboxylic homo- and copolymers may also be included as builders and to function as structurants or processing aids. Particularly preferred are polyacrylic acid (available under the trademark Acrysol from the Rohm and Haas Company) and acrylic-maleic acid copolymers (available under the trademark Sokalan from the BASF Corporation) and alkali metal or other salts thereof.

These builder materials may be present at a level of, for example, from 1 to 80% by weight, preferably from 10 to 60% by weight.

Upon dispersal in a wash water, the initial amount of peroxyacid should range in amount to yield anywhere from about 0.05 to about 250 ppm active oxygen per liter of water, preferably between about 1 to 50 ppm. Surfactant should be present in the wash water from about 0.05 to 1.0 grams per liter, preferably from 0.15 to 0.20 grams per liter. When present, the builder amount will range from about 0.1 to 3.0 grams per liter.

For detergent compositions, the bleaching effectiveness of the formulations is best achieved in alkaline to a highly alkaline pH solutions, i.e., 7 to 13, preferably 7 to 10, most preferably 8 to 10.

In a preferred embodiment, the peroxygen peroxy acid is encapsulated in a suitable material to provide encapsulates which are stable in an alkaline environment. The preferred encapsulating material is a parafin wax as described in Lang et al—U.S. Pat. No. 5,200,236, herein incorporated by reference.

The following examples will more fully illustrate the embodiments of this invention. All parts, percentages and proportions referred to herein and in the appended claims are by weight unless otherwise indicated.

EXAMPLE 1

O-carboxybenzamidoperoxyhexanoic acid having the structure:

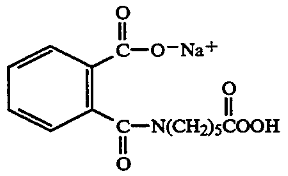

was prepared as follows. A 1500 ml glass beaker fitted with a magnetic stirrer was charged with 0.866g (3.13 mmol) epsilon-phthalimidoperoxyhexanoic acid (PAP), 1 liter water, and 1.06g (0.01 mol) sodium carbonate to give a pH of 10.0. The aqueous solution was stirred at 55° C. for 10 minutes. During this time, the pH of the reaction solution was kept constant by the use of sodium hydroxide. Upon completion of the experiment, the solution was analyzed for the presence of O-carboxybenzamidoperoxyhexanoic acid using NMR and UV spectroscopy.

O-carboxybenzamidoperoxyhexanoic acid is stable in D2O at pH 10.0, and has H1 resonances at 3.3 ppm, corresponding to the protons of the phenyl ring, and at 7.5 ppm, corresponding to the aliphatic N-alpha protons, relative to TMS. The related H1 resonances for epsilon-phthalimidoperoxyhexanoic acid (PAP) are centered at 3.7 ppm and 7.9 ppm, respectively. The percent yield was determined by comparing the relative heights of the H1 resonance lines for o-carboxybenzamidopero xyhexanoic acid with those for epsilonphthalimidoperoxyhexanoic acid (PAP). The percent yield of o-carboxybenzamidoperoxyhexanoic acid was determined to be >95%.

The UV spectrum of epsilon-phthalimidoperoxyhexanoic acid (PAP) shows an absorbance maximum at lambda=300 nm, while o-carboxybenzamidoperoxyhexanoic acid does not absorb at this wavelength. The concentration of o-carboxybenzamidoperoxyhexanoic acid in solution was calculated by subtracting the concentration of PAP measured in solution at lambda=300 nm from the concentration of PAP introduced at the start of the experiment (3.13 mmol). At the end of the experiment, >95% of the PAP introduced was converted to o-carboxybenzamidohexanoic acid.

EXAMPLE 2

The following automatic dishwashing formulation was prepared:

| | INGREDIENT | % BY WEIGHT |
|---|---|---|
| PREMIX 1 | Laponite[1] | 0.02 |
| | Carbopol 940[2] | 1.20 |
| | Deionized Water | (to 100%) |
| PREMIX 2 | Deionized Water | (to 100%) |
| | NaOH (50%) | 2.0 |
| | Glycerol | 4.0 |
| | Sodium Tetraborate | 2.7 |
| | Sodium Bicarbonate | 5.0 |
| | Sodium Carbonate | 5.0 |
| | Sodium Citrate ($2H_2O$) | 15.0 |
| PREMIX 3 | SLF-18[3] | 2.0 |

[1]A smectite clay supplied by Laport Industries of Widnes, Chesire, England
[2]A polymer thickener with a molecular weight of 4,000,000 supplied by B. F. Goodrich Co. of Cleveland, Ohio.
[3]A nonionic surfactant having a $C_{12}$ alkyl with 24 EOs supplied by Olin Corporation of Stamford, Connecticut.

The formulation was prepared by slowly adding the Carbopol 940® to the clay and deionized water to form Premix 1. Premix 2 was then prepared by combining the ingredients listed above. Premix 1 and 2 were mixed independently for 30–40 minutes until smooth. Premix 2 was poured into Premix 1 over 10 minutes and the resulting solution was stirred for 30 minutes. The nonionic surfactant (Premix 3) was added with stirring for five minutes and the formulation was stirred for 30–45 minutes until smooth.

4 grams of the formulation was placed in each of four beakers and deionized water was added to form a one liter solution in each beaker. The pH of each of the four solutions was adjusted with either NaOH or HCL to pH values of 7 to 10.

EXAMPLE 3

0.02% of $[Mn^{*V}_2(\mu\text{-}O)(Me\text{-}TACN)_2](PF_6)_2$ was combined with 9.2% of o-carboxybenzamidoperoxyhexanoic acid and magnesium monoperoxyphthalate, respectively. The catalyst/peroxy acid combinations were added to the formulations of Example 2 so that four samples of each peroxy acid/catalyst combination having pH values of 7–10 were obtained.

Control samples containing only the peroxy acid without the catalyst were also prepared.

EXAMPLE 4

The bleaching performance of the o-carboxybenzamidoperoxyhexanoic acid and the maganese complex catalyst compositions of the present invention at a pH range of from 7 to 10 was evaluated against BC-1 test cloths. The BC-1 cloths were washed in a terg-o-tometer for 30 minutes at 55° C. in a 1000 ml aqueous wash solution. The dosage of the peracid compound was 20 ppm active oxygen. Stain bleaching was measured reflectrometrically using a Colorgard/05 System Reflectometer.

Bleaching was indicated by an increase in reflectance, reported as ΔΔR. In general a ΔΔR of one unit is perceivable in a paired comparison while ΔΔR of two units is perceivable monadically. In reporting the reflectance change, the change in reflectance caused by general detergency has been accounted for. Thus ΔΔR can actually be expressed as:

$$\Delta\Delta R = \Delta R\ \textit{peracid+detergent} - \Delta \textit{detergent}$$

where ΔR is the reflectance difference of the stained fabric after and before washing.

The compositions of Example 1 (without the addition of the manganese catalyst) were used as a control.

It was observed that the bleaching performance of the compositions containing only the peroxy acid decreased progressively from pH 7 to pH 10 as illustrated in Table 1.

TABLE 1

| ΔΔR Values corresponding to pH | 7 | 8 | 9 | 10 |
|---|---|---|---|---|
| uncatalyzed o-carboxybenzamido peroxyhexanoic acid | 7.4 | 6.4 | 4.6 | 2.7 |
| o-carboxybenzamidoperoxy hexanoic acid and manganese complex catalyst | 11.5 | 11.9 | 12.0 | 14.8 |

In contrast, the bleaching compositions containing both o-carboxybenzamidoperoxyhexanoic acid and the manganese complex catalyst were observed to be significantly better throughout the pH range of 7 to 10. (See Table 1). It was further observed that rather than decreasing in bleaching performance at the higher alkaline pHs, the compositions of the invention increased performance and remained stable in the range of pH 8 to 10.

EXAMPLE 5

The bleaching performance of the magnesium monoperoxyphthtalate and the manganese complex compositions of the present invention at pH 8.5 and 10 was evaluated against BC-1 test cloths. The BC-1 cloths were washed in a terg-O-tometer for 30 minutes at 50° C. in a 1000 ml aqueous wash solution. The dosage of the peracid compound was 20 ppm active oxygen. Stain bleaching was measured reflectrometrically using a Colorgard/05 System Reflectometer. Bleaching was indicated by an increase in reflectance, reported as ΔΔR as described in Example 4 and tabulated in Table 2:

TABLE 2

| ΔΔR values corresponding to pH 8.5 and 10 | pH 8.5 | pH 10 |
|---|---|---|
| uncatalyzed magnesium monoperoxyphthtalate | 5.2 | 3.2 |
| magnesium monoperoxyphthtalate and manganese complex catalyst | 14.8 | 15.5 |

TABLE 2

It was observed that the bleaching performance of the peroxy acid alone was not as effective as the combination of the peroxy acid and the catalyst.

Moreover, the uncatalyzed composition decreased in performance from pH 8.5 to 10 while the bleaching performance of the catalyzed composition of the invention remained stable over the same pH 8.5 to 10 range.

EXAMPLE 6

For comparison, compositions of the prior art containing epsilonphthalimidoperhexanoic acid (PAP) with and without the presence of $[Mn^{IV}_2(\mu\text{-}O)_3(Me\text{-}TACN)_2](PF_6)_2$, were prepared according to Examples 2 and 3. The bleaching performance of the prior art compositions was evaluated against common stains in the pH range of 7 to 10 as described in Examples 4 and 5.

It was observed that the PAP containing compositions both with and without the presence of the manganese complex catalyst exhibited the same bleaching performance at pH 7 and 8. The bleaching performance of the compositions without the manganese complex, however, dropped dramatically at pH values 9 and 10 as illustrated in Table 3.

TABLE 3

| ΔΔR values corresponding to pH | 7 | 8 | 9 | 10 |
|---|---|---|---|---|
| uncatalyzed epsilon-phthalimido peroxyhexanoic acid | 25.4 | 25.4 | 17.8 | 2.6 |
| epsilon-phthalimidoperoxy hexanoic acid and manganese complex catalyst | 25.2 | 25.0 | 20.8 | 17.5 |

Thus, the bleaching performance of the prior art peroxygen compound in highly alkaline pH formulations dramatically decreases in a pH range above 8. The addition of the manganese catalyst does not prevent the decrease of the bleaching performance of the prior art compositions at a pH of greater than 8. In contrast, the bleaching performance of the catalyzed compositions of the invention was observed to increase in the same pH range of 8 to 10.

We claim:

1. A method for bleaching a substrate comprising: applying to a substrate an effective amount to remove stain of a bleaching composition comprising:

(a) 1 to 40 wt. % of an amido organic peroxyacid compound having a formula $$MO\overset{\overset{O}{\|}}{C}-R-(R^1N)_n(\overset{\overset{O}{\|}}{C})_x(NR^2)_m-R^3-\overset{\overset{O}{\|}}{C}OOM \qquad (I)$$

wherein:

R is selected from the group consisting of $C_1$–$C_{16}$alkylene, $C_1$–$C_{16}$cycloalkylene and $C_6$–$C_{12}$arylene radicals, $R^1$ is selected from the group consisting of hydrogen, $C_1$–$C_{16}$cycloalkyl and $C_6$–$C_{12}$aryl radicals, $R^2$ is selected from the group consisting of hydrogen, $C_1$–$C_{16}$alkyl, $C_1$–$C_{16}$cycloalkyl and $C_6$–$C_{12}$aryl radicals and a carbonyl radical that can form a ring together with R when R is arylene, $R^3$ is selected from the group consisting of $C_1$–$C_{16}$alkylene, $C_5$–$C_{12}$cycloalkylene and $C_6$–$C_{12}$arylene radicals, n is 0 or 1 and m is 0 or 1 and the sum of N and m is not greater than 1, x is 0 or 1, M is selected from the group consisting of hydrogen, alkali metal, alkaline earth metal, ammonium and alkanolammonium cations and radicals, or a salt functional unit of the amido organic peroxyacid compounds of Formula (I); (b) 0.001 to 0.05% by weight of a manganese complex having a formula selected from the group consisting of:

$$[LMnX_3]Y \quad (1)$$

wherein:

Mn is manganese,

X is a coordinating species selected from the group consisting of: $RO^-$, $Cl^-$, $Br^-$, $I^-$, $F^-$, $NCS^-$, $N_3^-$, $I_3^-$, $NH_3$, $NR_3$, $RCOO^-$, $RSO_3^-$, $RSO_4^-$, $OH^-$, $O_2^{2-}$, $HOO^-$, $H_2O$, $SH^-$, $CN^-$, $OCN^-$, and $S_4^{2-}$ and combinations thereof, R is a $C_1$–$C_{20}$ radical selected from the group consisting of alkyl, cycloalkyl, aryl, benzyl and radical combinations thereof, at least two R radicals may also be connected to one another so as to form a bridging unit between two oxygens that coordinate with the manganese, L is a ligand selected from a $C_3$–$C_{60}$ radical having at least 3 nitrogen atoms coordinating with the manganese, and Y is an oxidatively-stable counterion, and the formula:

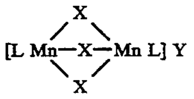

(2)

wherein Mn is manganese in a +III or +IV oxidation state and X, L and Y are as defined above; and (c) from about 0.5 to about 50 wt. % of a surfactant.

2. A method according to claim 1, wherein the peroxyacid compound is o-carboxybenzamidoperoxy hexanoic acid.

3. A bleaching composition comprising:

(a) 1 to 40 wt. % of an amido organic peroxyacid compound having a formula $$MO\overset{O}{\overset{\|}{C}}-R-(R^1N)_n(\overset{O}{\overset{\|}{C}})_x(NR^2)_m-R^3-\overset{O}{\overset{\|}{C}}OOM \quad (I)$$

wherein:

R is selected from the group consisting of $C_1$–$C_{16}$alkylene, $C_1$–$C_{16}$cycloalkylene and $C_6$–$C_{12}$arylene radicals, $R^1$ is selected from the group consisting of hydrogen, $C_1$–$C_{16}$cycloalkyl and $C_6$–$C_{12}$aryl radicals, $R^2$ is selected from the group consisting of hydrogen, $C_1$–$C_{16}$alkyl, $C_1$–$C_{16}$cycloalkyl and $C_6$–$C_{12}$aryl radicals and a carbonyl radical that can form a ring together with R when R is arylene, $R^3$ is selected from the group consisting of $C_1$–$C_{16}$alkylene, $C_5$–$C_{12}$cycloalkylene and $C_6$–$C_{12}$arylene radicals, n is 0 or 1 and m is 0 or 1 and the sum of N and m is not greater than 1, x is 0 or 1, M is selected from the group consisting of hydrogen, alkali metal, alkaline earth metal, ammonium and alkanolammonium cations and radicals, or a salt functional unit of the amido organic peroxyacid compounds of Formula (I);

(b) 0.001 to 0.05% by weight of a manganese complex having a formula selected from the group consisting of:

$$[LMnX_3]Y \quad (1)$$

wherein:

Mn is manganese,

X is a coordinating species selected from the group consisting of: $RO^-$, $Cl^-$, $Br^-$, $I^-$, $F^-$, $NCS^-$, $N_3^-$, $I_3^-$, $NH_3$, $NR_3$, $RCOO^-$, $RSO_3^-$, $RSO_4^-$, $OH^-$, $O_2^{2-}$, $HOO^-$, $H_2O$, $SH^-$, $CN^-$, $OCN^-$, and $S_4^{2-}$ and combinations thereof;

R is a $C_1$–$C_{20}$ radical selected from the group consisting of alkyl, cycloalkyl, aryl, benzyl and radical combinations thereof, at least two R radicals may also be connected to one another so as to form a bridging unit between two oxygens that coordinate with the manganese, L is a ligand selected from a $C_3$–$C_{60}$ radical having at least 3 nitrogen atoms coordinating with the manganese, and Y is an oxidatively-stable counterion, and the formula:

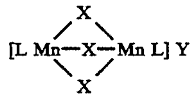

(2)

wherein Mn is manganese in a +III or +IV oxidation state and X, L and Y are as defined above; and (c) from about 0.5 to about 50 wt. % of a surfactant.

4. A bleaching composition according to claim 3 wherein the peroxyacid compound has the structure III:

(III)

wherein:

z is an integer ranging from 1 to 12 and M and $R^2$ are as described in claim 3.

5. A bleaching composition according to claim 3 wherein the peroxyacid compound has the formula:

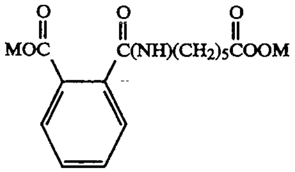
(IV)
and M is as described in claim 3.
6. A bleaching composition according to claim 3 wherein the manganese complex has the formula $[Mn^{IV}_2(\mu\text{-}O)_3(MeTACN)_2](PF_6)_2$.
7. A bleaching composition according to claim 3 further comprising a builder selected from the group consisting of sodium citrate, oxydisuccinate and tartrate mona- and di-succinates.
* * * * *